Jan. 1, 1935.                F. PRITCHARD                1,986,748
              CLIP FOR TUBULAR HOSE AND THE LIKE
                       Filed Feb. 2, 1934
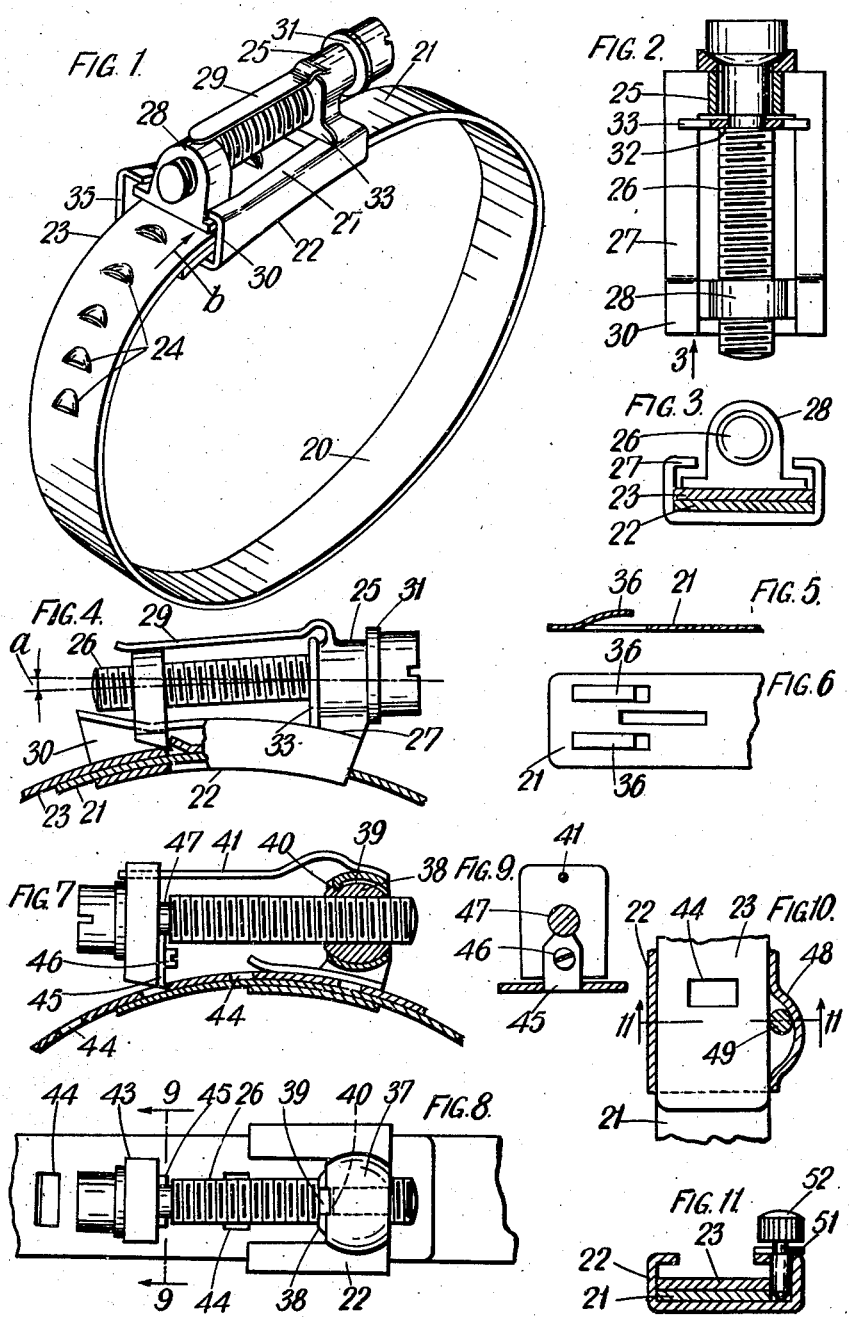
INVENTOR.
F. Pritchard
by Just Lurie Atty.

Patented Jan. 1, 1935

1,986,748

UNITED STATES PATENT OFFICE 1,986,748

CLIP FOR TUBULAR HOSE AND THE LIKE

Fredrick Pritchard, Birmingham, England, assignor to Messrs. Hunt & Turner, Limited, Birmingham, England, a limited-liability company of Great Britain and Northern Ireland Application February 2, 1934, Serial No. 709,522
In Great Britain February 23, 1933

8 Claims. (Cl. 24—19)

This invention relates to improvements in clamps or clips for fixing hose pipes or the like to a nipple, metal or other pipe or fixed part and is generally applicable to all purposes where a flexible member is to be bound or attached in a substantially fluid tight manner to a fixed part. The invention has more particular reference to that type of hose clip in which the tightening mechanism is permanently mounted on one end of a metal or like tightening band, the other or free end of which may be entered into a guide or housing which accommodates the said tightening mechanism, this free end being engaged by the tightening mechanism so as to contract the band on to the hose or the like and thus retain the hose in a fluid tight manner on the nipple or fixed part. It has been known to employ for the tightening mechanism a screw mounted rotatably in the fixed housing and engaging in a partial screw thread formed on the outer surface of the free end of the band which is entered into the housing. Such known mechanism presents difficulties in starting the screw properly in the partial threads; it gives a very small holding surface whereby the engaging threads are readily damaged and indeed frequently slip when a strong tightening pressure is applied.

The object of the present invention is to provide an improved form of hose clip which may be rapidly, easily and reliably fixed in position and which shall also not present the manufacturing difficulties associated with the known form employing a screw engaging in a shallow partial thread formed on the outer surface of the thin metal band.

A characteristic feature of the present invention is that it has what is known amongst mechanics as a quick grip action, by which is meant that the clip can be placed in position by hand till the clipping band contacts with the outer surface of the hose all round and the screw need then only be operated to give the tightening effect. Another characteristic of this invention is that the strength of the tightening grip is very considerably greater with my improved clip than with the known form, which whilst providing a grip quite adequate for radiator hose on automobiles, where the pressure is only substantially atmospheric, was unreliable when used on hose which had to withstand a substantial fluid pressure. Thus for the first time there is provided a hose clip which is not composed of separate or hinged parts and which gives an all round hold of the clip on the hose pipe, and does so in a manner enabling the pipe to withstand ordinary fluid pressures such as hose are frequently called upon to withstand.

The invention is illustrated in some typical forms in the accompanying drawing in which:—

Figure 1 is a perspective view of a hose clip in accordance with this invention.

Figure 2 is a plan view partly in section of the housing and screw mechanism.

Figure 3 is an end elevation looking in the direction of the arrow 3 in Figure 2.

Figure 4 is a side elevation of the housing and screw mechanism.

Figure 5 is an elevation and

Figure 6 is a plan of the fixed end of the band showing a modified form of spring mechanism for effecting the preliminary engagement of the operating parts when starting to tighten the clip.

Figure 7 is a sectional side elevation of a modified form of the improved clip.

Figure 8 is a plan of the clip shown in Figure 7.

Figure 9 is a section of the band and screw on the plane 9—9 of Figure 8.

Figure 10 is a detail view showing one manner of applying a detent action to enable the clamp to be tightened in two or more bites.

Figure 11 is a section on the line 11—11 of Figure 10.

In carrying the invention into effect as shown in the form illustrated in Figs. 1-4, the clamp comprises a band 20 having one end 21 fixed in any suitable manner, as by welding or the like, to a housing 22, whilst the other, free end, 23 is provided at suitable spaced intervals with wedge shaped projections 24 which constitute engaging members and act after the manner of rack teeth. The housing 22 is shaped from a metal plate so as to form a loose fitting bearing boss 25 for a screw 26 as well as a guide box 27. This guide box 27 is adapted to receive the free end of the band when it is entered therein and in addition it accommodates a traversing slide or claw member 28 which is threaded on the screw 26. The band 20 is preferably made of a springy nature and is of greater length than the perimeter of the hose pipe it is intended to clip. Normally this springy action is adequate to make the claw member 28 engage with the wedge shaped projections 24. In some cases however the resilient engagement of the claw member 28 and the projections 24 may be effected by special spring means, as for instance the spring tongue 29 formed integral with the bearing boss and adapted to press on the top of the traversing claw member 28 and cause the said claw to snap on to the top surface of the free end of the band when the said free end is entered into the guide box of the housing. The guide box 27 is, at and near the point where the free end of the band 23 enters, made with a widened gate portion 30 so that when the member 28 is within this portion, it may rise to allow the projections 24 to pass when the free end is pressed or pushed by the hand into place in the direction of the arrow b in Figure 1. To enable this movement the screw 26 is capable of tilting or pivoting through a small angle in the plane of the clamp. The screw 26 fits with clearance in the bearing 25 and its head is conveniently spherical to bear on a spherical washer 31 as indicated in Figure 2. To hold the screw 26 from longitudinal movement, a groove 32 is formed therein and in this groove there engages a collar 33 which may be in the form of a wire bent round and laid in the groove or it may be in the form of the horseshoe rider member shown. The rotation of the screw thus causes the slidable operating member 28 to travel along the guide 27 and thereby the claw portion of member 28 engages one of the projections 24 and thus the band is contracted to tighten it on to the exterior of the hose pipe. The flanges 35 of the guide 27 retain the foot of the claw 28 in positive engagement with the projection 24 as soon as the member 28 enters the narrow portion of the guide and it is of course when the claw member 28 is in this part of the guide that the powerful clamping action is applied. The resilient engagement of these operating members 28 and 24 therefore is only of a temporary nature. The guide box 27 is of arcuate form and the slight tilting movement of the screw allows the said screw to accommodate itself to the arcuate path of the claw member 28. The angle a in Figure 4 indicates this pivotal movement.

In operation the band is opened out with the free end 23 out of the guide box 27 and in this state the band is passed over the hose pipe. The end 23 is then entered in the guide box 27 and slid along it till the band lies close against the outside of the hose. The claw member 28 meanwhile lies in the widened gate portion 30 of the guide box 27 and the spring action allows it to slip over the wedge face of the projections 24 as the band end 23 is pushed into place. When the band has been placed in position by hand as described, it will remain in position while a screw driver applies the pressure. As the narrow part of the guide box 27 will only accommodate the band and the foot of the claw member 28, the latter is held positively in engagement with the front radial face of the projection 24 and a very powerful clamping action can be applied without danger of slipping. On removal of the clip the actions described are reversed and there is no danger, as in known designs, of the clip having been damaged. With the worm and screw type of clip, the damage caused to the threads frequently rendered the replacement of a used clip impracticable.

In place of the spring 29 or in addition to the spring action of the free end 23, spring tongues 36 may be formed on the fixed end of the band as shown in Figures 5 and 6, to press the free end 23 into engagement with the claw member 28.

In the form shown in Figures 7-9, the housing 23 is shortened and is formed with a spherical bearing 37 which contains a threaded nut 38. This nut is held from rotation with the screw 26 by forming a groove 39 on the nut 38 and a lug 40 formed on the shortened bearing engages in the groove 39. The nut may thus pivot in the plane of the clip but is at the same time held from rotation with the screw 26. This pivotal movement of the nut allows the screw also to pivot for the purpose described above with reference to Figures 1-4. The screw rotates freely in the boss formed on the claw member 43. In this form the spaced engaging members on the free end 23 of the band are shown as holes 44 pierced at intervals and these holes perform the same function as the wedge shaped projections 24 in Figures 1-4. A hard steel pusher face 45 fixed by a pin 46 to the front of the slidable member 43 forms the pressure face of the claw 43 and in this case also engages in a groove formed on the neck of the screw 26 as shown at 47. The slidable operating member 43 is thus constrained to follow the head of the screw 26 in both directions required for tightening and slackening the clip respectively.

The guidance of the slidable operating member 43 in this case is effected in part by the screw 26 and in part by a spring 41 engaging in a hole drilled in the slidable member 43. The spring 41 is attached in any suitable manner, as by welding, to the boss of the spherical housing for the nut 38. If desired the spring may be of rectangular cross section so as to give improved guiding action.

In most cases the required amount of travel for tightening the clip will be provided by the form shown in Figs. 1-4 or where a slightly greater travel is necessary, the form shown in Figures 7-9 may be employed. Where a very long travel of the claw member is necessary, the clamping action may be effected in two or more travels or "bites", the claw acting after the manner of a pawl co-acting with the rack constituted by the wedge shaped projections. To hold the parts in the partially taut position at the end of each travel and whilst the slidable claw member is being returned to take a fresh bite, the roller and wedge grip mechanism shown in Figs. 10 and 11 or some equivalent device may be employed to give the detent action. A wedge shaped casing 48 is pressed out on the housing 22 and a roller 49 is inserted therein. The roller is held in place by a slotted plate 51 which engages in a grooved neck on the roller 49 and a milled head 52 enables the roller 49 to be disengaged when it is desired to remove the clamp. An advantage of a wedge grip is that the effective clamping force is shared by the operating member and the roller 49. The action of such a roller and wedge grip is well understood and need not be more fully explained herein.

It will be readily understood by those engaged in this art that the parts may be plated or suitably coated with a decorative or non-corrosive metal without interfering with the effective operation thereof. The improved clip operates with what is generally known as a quick grip action whereby the tightening mechanism is not required to take up all the slack before the clamping action proper commences. The parts of the clamp may be readily lubricated and it does not tend to set firm on the hose or the like whilst at the same time a very strong clamping action is obtained in use. A particularly important feature of the improved clip resides in the fact that such clip may be inserted in place and tightened with one hand only.

I claim:—

1. A hose or like clip having a metal band, a housing attached rigidly to one end of said band and forming a guide into which the other, free end of the band may be entered and slid, a threaded member rotatably mounted in said housing, a traversible operating member also guided in said housing and engaging said screw and a series of spaced members constituting a rack on the end of said band which is entered and slid into the housing.

2. A hose or like clip having a metal band, a housing attached rigidly to one end of said band and forming a guide into which the other end of the band may be entered and slid, a threaded member rotatably mounted in said housing, a traversible operating member, guided in said housing and engaging said screw, said member being adapted to swing for a small angle in the plane of the clip and a series of spaced members constituting a rack on the end of said band which is entered and slid into the housing.

3. A hose or like clip having a metal band, a housing attached rigidly to one end of said band and forming a guide into which the other end is entered and slid, a widened gate portion at the end of said guide where the band is entered, a threaded member rotatably mounted in said housing and adapted to tilt for a small angle in the plane of the clip, a traversible operating member guided in said housing and engaging said screw, the said band and the traversing member fitting in said guide in the housing but capable of swinging through a small angle when said traversible member is located in the widened gate portion of said guide and a series of spaced members constituting a rack on the end of said band which is entered and slid into the housing.

4. A hose or like clip as claimed in claim 3 and further characterized by the fact that the traversible operating member and the rack members on the end of the band are held in engagement by resilient means whilst the operating member is located in the widened portion of the guide in the housing.

5. A hose clip as claimed in claim 1 characterized in that the spaced rack members are of wedge shape and are formed by pressing out from the band portions which offer a radial face to the traversible operating member.

6. A hose or like clip having a metal band, a housing attached rigidly to one end of said band and forming a guide into which the other end of the band is entered and slid, a threaded member mounted in said housing and engaging a threaded part therein, a traversible operating member mounted on said threaded member and guided by said housing and threaded member jointly and a series of spaced members constituting a rack on the end of said band which is entered and slid into the housing.

7. A hose clip as claimed in claim 1 having detent means for retaining the band in the advanced position when the operating member is first traversed forwards and then rearwards.

8. A hose clip having a metal band with overlapping ends to wrap around the hose, screw means mounted on the inner band part of said overlapping ends, a claw member operated by said screw means, wedge shaped rack members on the outer surface of the overlying part of the said overlapping ends of the band and guiding means to hold said claw member and rack members in positive engagement during the tightening operation but in one position of the claw member permitting the said claw member to ride over the inclined side of the said wedge shaped rock members.

FREDRICK PRITCHARD.